US010798196B1

(12) United States Patent
Gohil (10) Patent No.: US 10,798,196 B1
(45) Date of Patent: Oct. 6, 2020

(54) WIRELESS COMMUNICATION SYSTEM SELF-HEALING TRANSACTION STATE KEEPER

(71) Applicant: Sprint Communications Company L.P., Overland Park, KS (US)

(72) Inventor: Jaideepsinh Gohil, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 330 days.

(21) Appl. No.: 15/838,038

(22) Filed: Dec. 11, 2017

(51) Int. Cl.
*H04L 29/08* (2006.01)
*H04W 4/02* (2018.01)

(52) U.S. Cl.
CPC .............. *H04L 67/26* (2013.01); *H04L 67/18* (2013.01); *H04W 4/023* (2013.01)

(58) Field of Classification Search
CPC ......... H04L 67/26; H04L 67/18; H04W 4/023
See application file for complete search history.

(56) References Cited

U.S. PATENT DOCUMENTS

| 2014/0280766 A1* | 9/2014 | Banerjee | H04L 65/60 709/219 |
| 2017/0083396 A1* | 3/2017 | Bishop | G06F 11/14 |
| 2017/0091038 A1* | 3/2017 | Whitner | G06F 11/1658 |

* cited by examiner

*Primary Examiner* — Nasser M Goodarzi
*Assistant Examiner* — Adil Ocak (57) ABSTRACT

A method of adapting content distribution. The method comprises receiving event data reported by an electronic device by a message queue, assigning a state to each batch by a state management application, processing the batch by the processing application, sending a processed message that identifies the processed batch to the state management application, monitoring the sent processed messages by a state keeper component, wherein the monitoring comprises keeping a list of identities of batches that have been processed, searching the list of identities of processed batches to find an identity of a retrieved but not yet processed batch, stopping processing a batch by the processing application for a batch that is found by searching in the list of identities of processed batches, and assigning a processed value to the state of the retrieved batch that is found in the list of identities of processed batches by the state keeper component.

20 Claims, 4 Drawing Sheets

WIRELESS COMMUNICATION SYSTEM SELF-HEALING TRANSACTION STATE KEEPER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Computer systems may generate large flows of data. Different computers within the computer system may be used to implement architectural layers of a composite data flow, where the data may flow from a data source to a first layer, from the first layer to a second layer, from the second layer to other layers and ultimately to a final layer. Some of the layers may provide a message queuing function to decouple a lower layer from a higher layer, so the two layers need not synchronize to coordinate the flow of data. For example, a lower layer may push a message to the message queue, where the message comprises some data or information to be processed by a higher layer. The higher layer retrieves the message from the message queue when it is ready to process it. If the message queue is empty, the higher layer waits until another message is available. In this way the lower layer does not have to handshake with the higher layer to pass messages.

SUMMARY

In an embodiment, a method of automatically adapting electronic content distribution is disclosed. The method comprises receiving event data by a message queue executed on a computer system, where the event data comprises batches of tuples and each tuple comprises a transaction identity and data associated with an event reported by an electronic device that receives distributed electronic content, assigning a state to each batch by a state management application executed on the computer system, where the state of a batch takes a value of not processed or processed, and retrieving a batch by a processing application executed on the computer system from the message queue while leaving the batch on the message queue. The method further comprises processing the batch by the processing application, where the processing comprises one of incrementing a count in a memory store of the computer system, copying a final count from the memory store to a data store, or storing data in a cloud memory storage, after processing the batch, sending a processed message that identifies the processed batch to the state management application by the processing application, and monitoring processed messages sent by the processing application to the state management application by a state keeper component that executes on the computer system, wherein the monitoring comprises keeping a list of identities of batches that have been processed. The method further comprises searching the list of identities of processed batches maintained by the state keeper component to find an identity of a retrieved but not yet processed batch, stopping processing a batch by the processing application for a batch that is found by searching in the list of identities of processed batches, and assigning a processed value to the state of the retrieved batch that is found in the list of identities of processed batches by the state keeper component, whereby duplicated processing of batches is avoided.

In another embodiment, a method of automatically adapting electronic content distribution is disclosed. The method comprises receiving event data by a message queue executed on a computer system, where the event data comprises batches of tuples and each tuple comprises a transaction identity and data associated with an event reported by an electronic device that receives distributed electronic content, assigning a state to each batch by a state management application executed on the computer system, where the state of a batch takes a value of not processed or processed, and retrieving a batch by a processing application executed on the computer system from the message queue while leaving the batch on the message queue, where the processing application relies on a once-and-only-once processing mode. The method further comprises processing the batch by the processing application, where the processing comprises one of incrementing a count in a memory store of the computer system, copying a final count from the memory store to a data store, or storing data in a cloud memory storage and, after processing the batch, sending a processed message that identifies the processed batch to the state management application by the processing application. The method further comprises monitoring processed messages sent by the processing application to the state management application by a state keeper component that executes on the computer system, wherein the monitoring comprises keeping a list of identities of batches that have been processed, searching the list of identities of processed batches maintained by the state keeper component to find an identity of a retrieved but not yet processed batch, and stopping processing a batch by the processing application for a batch that is found by searching in the list of identities of processed batches.

In yet another embodiment, a method of automatically adapting electronic content distribution is disclosed. The method comprises receiving event data by a message queue executed on a computer system, where the event data comprises batches of tuples and each tuple comprises a transaction identity and data associated with an event reported by an electronic device that receives distributed electronic content, assigning a state to each batch by a state management layer executed on the computer system, where the state of a batch takes a value of not processed or processed, retrieving a batch by a processing layer executed on the computer system from the message queue while leaving the batch on the message queue, and processing the batch by the processing layer, where the processing comprises one of incrementing a count in a memory store of the computer system, copying a final count from the memory store to a data store, or storing data in a cloud memory storage. The method further comprises, after processing the batch, sending a processed message that identifies the processed batch to the state management layer by the processing layer, monitoring processed messages sent by the processing layer to the state management layer by a state keeper component that executes on the computer system, wherein the monitoring comprises keeping a list of identities of batches that have been processed, searching the list of identities of processed batches maintained by the state keeper component to find an identity of a retrieved but not yet processed batch, and stopping processing a batch by the processing layer for a batch that is found by searching in the list of identities of processed batches.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The disclosure teaches a mobile communication device event processing and electronic content adaptive distribution system. A large volume of event data is generated by mobile communication devices (e.g., mobile phones) in a wireless communication network that is flowed to a system that processes the event data. The results of the processed event data, for example counts of specific event types and reports that summarize such counts, is then used to adapt distribution of electronic content to the mobile communication devices. This can be seen as a feedback control type of system according to one perspective. This system may receive event data from tens of millions of devices at a flow rate of tens of megabytes of data per second during some operating conditions. A technical problem arises in that sometimes, for yet unknown reasons, data that has been processed by the system is not properly marked as processed, and the same data may be repeatedly processed by the system thousands of times, corrupting counts and reports and hence interfering with the adaptation of the content distribution system.

The system that processes the event data is a distributed system having a plurality of computers or servers implementing each of the layers of the processing system. A load balancing layer receives raw event data from mobile communication devices and distributes this event data to a plurality of servers that implement a message queue layer of the system. Each item of event data is associated with a specific topic and is placed on a message queue that corresponds to that specific topic. A processing layer of the system may be implemented by a plurality of servers. A plurality of processes or threads may execute on a single one of the servers of the processing layer. Each process or thread subscribes to one of the topics and processes event data associated with the topic that is stored in the message queue. Note that the process or thread obtains a copy from the message queue while the original event data may remain stored on the message queue.

An event data state management layer of the system may be implemented by a plurality of servers. When a process or thread processes an item of event data, it informs the state management layer of the system, and the state management layer marks the subject item of event data as processed in the messaging queue. Before obtaining a copy of event data from the messaging queue to process, a process or thread confirms that the subject item of event data has not been processed, by examining the state of the event data. But under some circumstances, the state of the event data in the message queue is not properly indicated as processed, which results in the same item of event data being processed repeatedly many times, throwing off counts and reports that summarize the event data. Correcting these reports is difficult and time consuming when undertaken, as it was previously, by a human being.

The present disclosure teaches incorporating a state keeper component within the processing layer of the system to record independently from the state management layer to processing of event data. Processes or threads, having obtained a copy of event data from the message queuing layer marked as unprocessed, double check with the state keeper component within the processing layer before proceeding to process the copied event data. If the state keeper indicates the event data has been processed, the process or thread drops the subject event data and retrieves a copy of another item of event data. In this way, repeated processing of the same item of event data can be reduced or eliminated. In an embodiment, when such a previously processed item of event data has been noted by a process or thread to remain marked as in an unprocessed state, the state keeper may intervene at the state management layer and change the state of the subject event data from the unprocessed state to the processed state. In an embodiment, when a previously processed item of event data has been noted by a process or thread to remain marked as in an unprocessed state, the stake keeper component may further search in-progress counts of event information related to the erroneously marked item of event data and back-out any errors that may have developed in the subject count.

Figure 1:
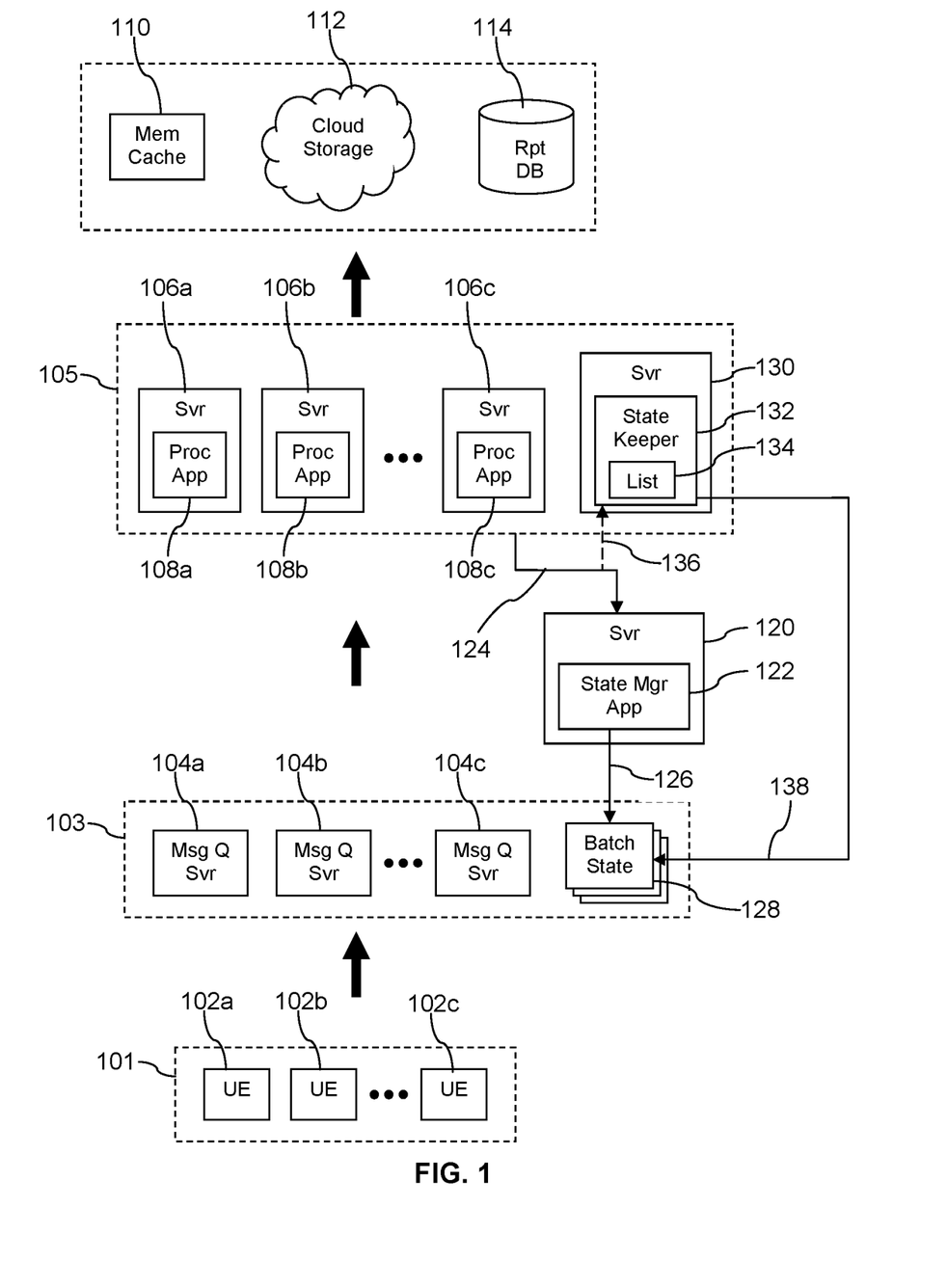
FIG. 1 is a block diagram of a system according to an embodiment of the disclosure.

Turning now to FIG. 1, a mobile communication device event data handling system 100 is described. In an embodiment, the system 100 comprises a plurality of mobile communication devices (e.g., user equipment—UE) 102. These UEs may comprise a first UE 102a, a second UE 102b, and a third UE 102c. It is understood that the system 100 may comprise any number of UEs 102 and may count in the range of tens of millions of devices. The plurality of UEs 102 may be considered, from one perspective, to be a mobile communication device event data source layer 101 of the system 100. The system 100 also comprises a plurality of message queue servers 104 and an event batch state list 128 that may be considered to be a message queue layer 103 from one perspective. The message queue servers 104 may comprise a first message queue server 104a, a second message queue server 104b, and a third message queue server 104c. While three message queue servers 104 are illustrated in FIG. 1, it is understood that the system 100 may comprise any number of message queue servers 104.

The system 100 also comprises a plurality of processing servers 106, for example a first processing server 106a, a second processing server 106b, and a third processing server 106c. Each processing server 106 executes a processing application 108. For example, the first processing server 106a executes a first processing application 108a, the second processing server 106b executes a second processing application 108b, and the third processing server 106c executes a third processing application 108c. The system 100 also comprises a state keeper server 130 that executes a state keeper application 132 and maintains a list of processed event batches 134. The processing servers 106 and the state keeper server 130 may be considered to be a processing layer 105 of the system 100 from one perspective. It is understood that the processing layer 105 may comprise any number of processing servers 106. The system 100 also comprises a state manager server 120 that executes a state manager application 122. The processing layer 105 provides processed event data up to one or more of a memory cache 110, to a cloud storage 112, and/or a report data store 114.

The mobile communication devices 102 may comprise devices of different types. For example the devices 102 may comprise mobile phones, smart phones, personal digital assistants (PDAs), wearable computers, headset computers, laptop computers, notebook computers, and/or tablet computers. The devices 102 may communicate wirelessly with a cell site and via the cell site to a network to obtain voice communication services or data communication services. Alternatively, the devices 102 may communicate wirelessly with a short range radio access point (AP), such as a WiFi AP, and therethrough to a network to obtain communication services.

The devices 102 produce event data that propagates up to the message queue layer 103. The devices 102 may transmit messages that contain or encapsulate event data. The event data may comprise information about a wide variety of different events. Event data may include information about a current location of a device 102, for example a GPS location fix (e.g., latitude and longitude coordinates) or trilateration information (e.g., signal strength data and cell site identities associated with each signal strength data). Event data may include information about a communication connection status such as connected or unconnected. Event data may include information about a launch of execution of a mobile application or the termination of execution a mobile application on a device 102. Event data may include information about specific actions taken within a browser application executing on a device 102, such as downloading a web page to the browser and/or clicking on content within a web page rendered by the browser. Event data may include information about web sites and/or host computers contacted by a device 102. Event data may include information about premium communication services accessed by a device 102. Event messages transmitted by devices 102 may comprise an identity of the sending device (e.g., a mobile equipment identity (MEID), a phone number, an IP address) as well as information about the event. The event messages may comprise an identity of an event category and/or event class. The event messages may comprise a time and date associated with the event. The event messages may comprise tuples that are the content of the event messages. These tuples may comprise a transaction identity and one or more information components or information fields.

The event data messages sent by the devices 102 may be received by one or more load balancers (not shown), and the load balancers may push the event data onto specific ones of the message queue servers 104 in the message queue layer 103. In an embodiment, the load balancers may determine a type, category, or class of event data and distribute the event data to message queue servers 104 according to topics or categories of event that are handled by the message queue servers 104. For example, a load balancer may send event data pertaining to location of a device 102 to the first message queue server 104a which is known to host a location event topic and send event data pertaining to data session connection of a device 102 to the second message queue server 104b which is known to host a data session connection event topic. The load balancers may further aggregate a plurality of event messages associated to the same topic in a batch of about 15 event messages, a batch of about 35 event messages, a batch of about 50 event messages, or a batch of some other number of event messages. In an embodiment, the load balancers may parse a plurality of event messages associated to the same topic, strip off non-content information (e.g., any message header information and/or any message corroboration token such as a cyclic redundancy check (CRC) value), and store the tuples in each event message in a batch of about 15 tuples, a batch of about 35 tuples, a batch of about 50 tuples, or a batch of some other number of tuples.

The system 100 may desirably process event data (e.g., in the processing layer 105) that was propagated into the message queue layer 103 by the devices 102, for example to summarize the information, to aggregate the information, and/or to count events. For example, a processing application 108 may increment a count maintained in the memory cache 110 or store information in cloud storage 112. At a certain point in time or after a count reaches a threshold, a processing application 108 may copy the count from the memory cache 110 to the report data store 114. A processing application 108 may process a plurality of counts and other information in the report data store 114 to create a report that organizes and/or summarizes the count data. This processed information (e.g., the finished reports stored in the report data store 114) may then be used in various ways, by various data mining and data analysis systems (not shown), to adapt distribution of content to the devices 102 as well as to improve the performance of a wireless communication network. In an embodiment, the processed information may be used to build profiles of individuals and/or clusters of individuals that can be used to effectively target mobile advertisements and other electronic content to individuals associated with the devices 102.

Different processing applications 108 in the processing layer 105 may subscribe to different event topics on which event messages sent from the mobile communication devices 102 are stored in the messaging queue layer 103. Each different processing application 108 may provide different processing of event data. As a processing application 108 obtains a copy of a batch of event messages and processes the batch, it sends a message on a communication path 124 to the state manager application 122 executing on the state management server 120. In response, the state manager application 122 updates 126 a batch state 128 associated with the subject batch in the message queue layer 103. The state keeper application 132 monitors the communication path 124 and maintains the list 134 identifying batches of event messages that have been processed.

When a processing application 108 obtains a copy of a batch of event messages from the messaging queue layer 103, it provides an identity associated with the batch to the state keeper application 132. The state keeper application 132 searches the list 134 to see if the identified batch has been previously processed. If the batch has been previously processed, the state keeper application 132 causes the processing application 108 to not process that batch of event messages and instead to obtain a copy of another batch of event messages from the messaging queue layer 103. In an embodiment, the state keeper application 132 then accesses the batch state list 128 associated with the subject batch of event messages via a second communication path 138 and assigns a processed state to the batch state of the subject batch of event messages. This correction of the batch state list 128 may be referred to as a "self-healing" or a "healing" property of the system 100. The monitoring and oversight provided by the state keeper application 132 mitigates or entirely avoids the propagation of duplicate results out of the processing layer up to the memory cache 110, to the cloud storage 112, and to the report data store 114.

The message queue servers 104 and the processing servers 106 may be provided as virtual computing resources that may be expanded or contracted as loads on the messaging queue layer 103 and on the processing layer 105 change. While not illustrated in FIG. 1, the system 100 may be architected to have geolocational redundancy such that failure at one site or data center does not interdict the flow-through of event data from the data source layer 101 to the memory cache 110, the cloud storage 112, or the report data store 114.

In an embodiment, the messaging queue layer 103 may be implemented using a Kafka open-source stream processing platform. In an embodiment, the state manager application 122 may be implemented using Zookeeper. In an embodiment, the processing layer 105 may be implemented using Storm, a distributed stream processing computation framework. More specifically, the processing layer 105 may be implemented using Trident once-and-only-once processing. The processing applications that are executed in the processing layer 105 may be implemented as Storm bolts.

Figure 2A:
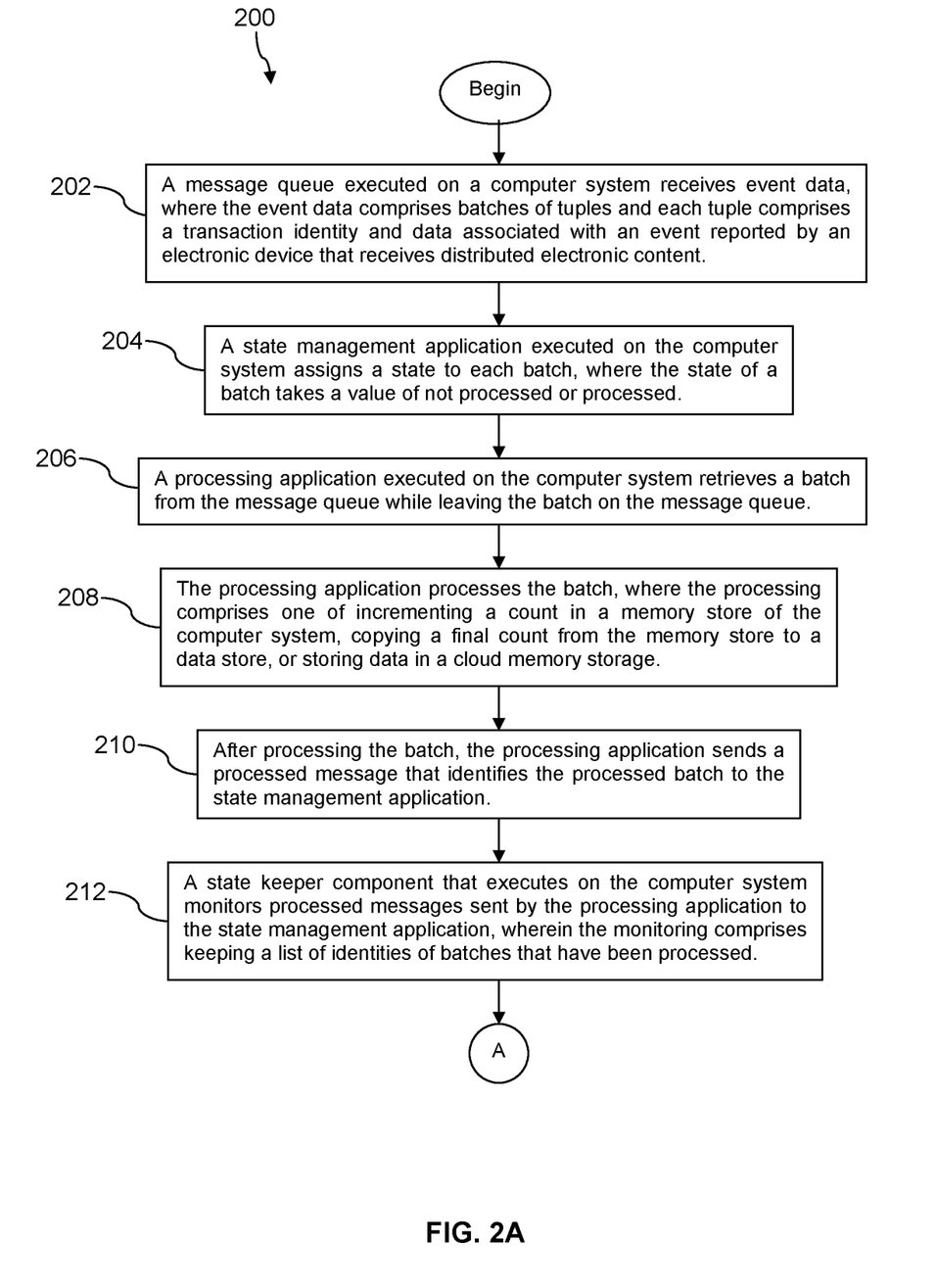
FIG. 2A and FIG. 2B is a flow chart of a method according to an embodiment of the disclosure.
Figure 2B:
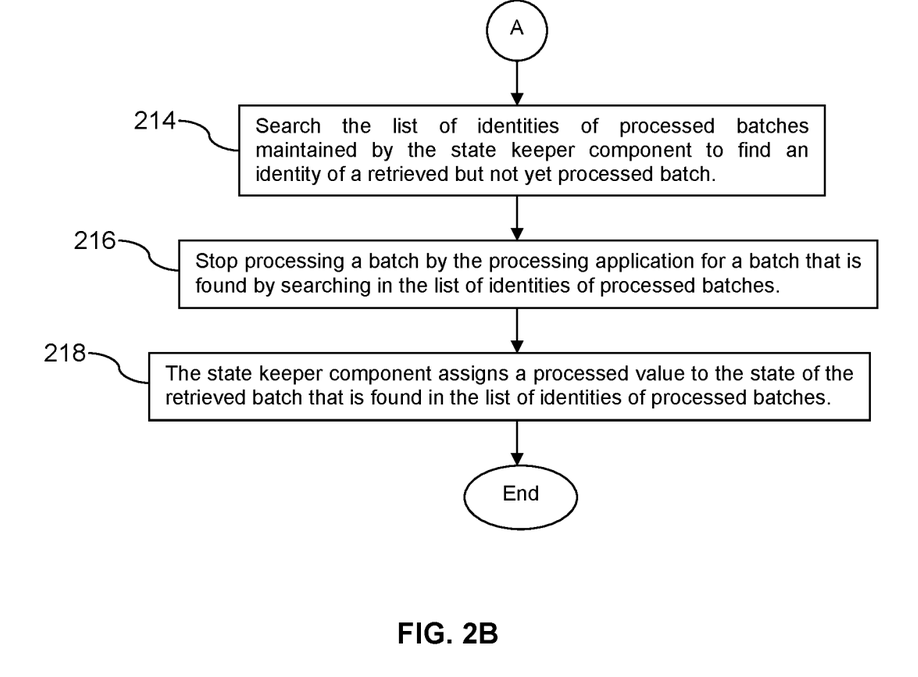

Turning now to FIG. 2A and FIG. 2B, a method 200 is described. In an embodiment, the 200 method may be used to automatically adapt electronic content distribution, for example by updating profile information used in selectively distributing content such as mobile advertisements, public service announcements, political announcements, and other content distributed to mobile communication devices. At block 202, event data is received by a message queue executed on a computer system, where the event data comprises batches of tuples and each tuple comprises a transaction identity and data associated with an event reported by an electronic device that receives distributed electronic content. The message queue may be implemented using a Kafka software package. The event messages and/or tuples may be sorted according to topics before aggregating into batches of tuples, where each batch of tuples comprises tuples associated with the same topic. At block 204, a state is assigned to each batch by a state management application executed on the computer system, where the state of a batch takes a value of not processed or processed. In an embodiment, the state management application may be implemented as a state management layer, for example a layer comprising a distributed state management application executing on a plurality of servers. In an embodiment, the state management application may be implemented using a ZooKeeper software package.

At block 206, a batch is retrieved by a processing application executed on the computer system from the message queue while leaving the batch on the message queue. Said in other words, the processing application may retrieve a copy of a batch from message queue, leaving the original batch of tuples on the message queue. The message queue may groom batches of tuples (e.g., delete or send to archival storage) after the batches age out, for example after a batch exceeds two days tenure on the message queue. The processing application may be implemented as a processing layer, for example a layer comprising a distributed processing application that executes on a plurality of servers. The processing layer may comprise a plurality of different processing applications, where each different processing application registers for different topics stored by the message queue. Each different processing application may provide different processing of batches of tuples, according to the nature of the topic the batches are assigned to.

The processing layer may be implemented using a Storm software product. In an embodiment, the processing layer may be implemented using a Trident Storm software product that provides "once-and-only-once" processing of batches. The "once-and-only-once" processing, however, may depend on the accuracy of the batch state list 128 maintained by the state management application 122 at the message queue layer 103. Thus, if the batch state list 128 of a batch is mistakenly represented as "unprocessed," the Trident Storm software product providing "once-and-only-once" processing of batches may nevertheless duplicate processing of the subject batch many times. It is at least partly to avoid this scenario that the present disclosure is directed to.

At block 208, the batch is processed by the processing application, where the processing comprises one of incrementing a count in a memory store of the computer system, copying a final count from the memory store to a data store, or storing data in a cloud memory storage. At block 210, after processing the batch, a processed message is sent that identifies the processed batch to the state management application by the processing application. At block 212, processed messages sent by the processing application to the state management application are monitored by a state keeper component that executes on the computer system, wherein the monitoring comprises keeping a list of identities of batches that have been processed.

At block 214, the list of identities of processed batches maintained by the state keeper component is searched to find an identity of a retrieved but not yet processed batch. At block 216, processing is stopped on a batch by the processing application for a batch that is found by searching in the list of identities of processed batches. At block 218, a processed value is assigned to the state of the retrieved batch that is found in the list of identities of processed batches by the state keeper component. Method 200 may mitigate or eliminate duplicated processing of batches is avoided. In an embodiment, the method 200 may further comprise analyzing the final counts stored in the data store to generate reports on responses of electronic devices to electronic content distributed to the device and adapting a campaign of distributing electronic content to electronic devices based on the reports.

Figure 3:
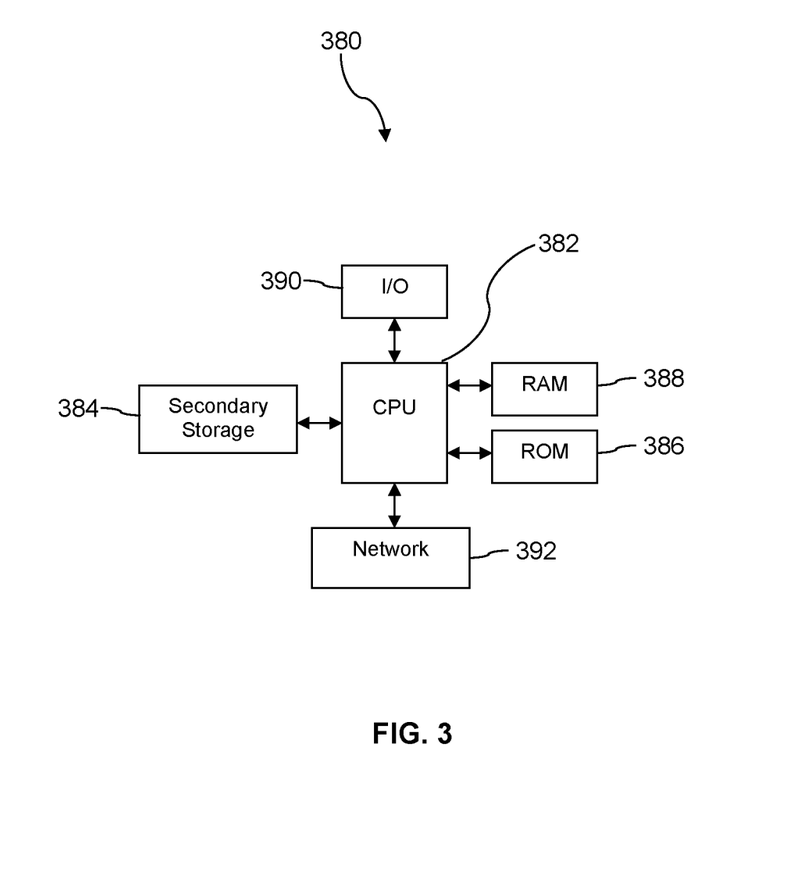
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of automatically adapting electronic content distribution, comprising:

receiving event data by a message queue executed on a computer system, where the event data comprises batches of tuples and each tuple comprises a transaction identity and data associated with an event reported by an electronic device that receives distributed electronic content;

assigning a state to each batch in a first list at a message queue layer by a state management application executed on the computer system, where the state of a batch takes a value of not processed or processed;

retrieving a batch by a processing application executed on the computer system from the message queue while leaving the batch on the message queue;

processing the batch by the processing application, where the processing comprises one of incrementing a count in a memory store of the computer system, copying a final count from the memory store to a data store, or storing data in a cloud memory storage;

after processing the batch, sending a processed message that identifies the processed batch to the state management application by the processing application;

monitoring processed messages sent by the processing application to the state management application by a state keeper component that executes on the computer system within a processing layer to record processing of event data independently from the state management application and the first list maintained by the state management application at the message queue layer, wherein the monitoring comprises keeping a second list at the processing layer of identities of batches that have been processed;

searching the second list maintained by the state keeper component at the processing layer for an identity of a retrieved but not yet processed batch;

in response to finding the identity of the retrieved batch in the second list maintained by the state keeper component at the processing layer based on the searching, stopping processing of the retrieved batch by the processing application; and assigning, in the first list, a processed value to the state of the retrieved batch that is found in the second list by the state keeper component, whereby duplicated processing of batches is avoided.

2. The method of claim 1, further comprising:
analyzing the final counts stored in the data store to generate reports on responses of electronic devices to electronic content distributed to the devices; and
adapting a campaign of distributing electronic content to electronic devices based on the reports.

3. The method of claim 2, wherein the electronic content distributed by the campaign to electronic devices comprises a mobile advertisement, a public service announcement, a political announcement, or combinations thereof.

4. The method of claim 1, wherein the event data comprises a current location of a mobile communication device, a communication connection status of a mobile communication device, an identification of a download of a web page, or an identification of a content click event.

5. The method of claim 4, wherein the event data comprises an identity of a mobile communication device.

6. The method of claim 4, wherein the event data comprises a time and date.

7. The method of claim 1, further comprising the processing application, after retrieving the batch from the message queue and before processing the batch, requesting the state keeper component to check the retrieved batch against the second list.

8. A method of automatically adapting electronic content distribution, comprising:
receiving event data by a message queue executed on a computer system, where the event data comprises batches of tuples and each tuple comprises a transaction identity and data associated with an event reported by an electronic device that receives distributed electronic content;
assigning a state to each batch in a first list at a message queue layer by a state management application executed on the computer system, where the state of a batch takes a value of not processed or processed;
retrieving a batch by a processing application executed on the computer system from the message queue while leaving the batch on the message queue, where the processing application relies on a once-and-only-once processing mode;
processing the batch by the processing application, where the processing comprises one of incrementing a count in a memory store of the computer system, copying a final count from the memory store to a data store, or storing data in a cloud memory storage;
after processing the batch, sending a processed message that identifies the processed batch to the state management application by the processing application;
monitoring processed messages sent by the processing application to the state management application by a state keeper component that executes on the computer system within a processing layer to record processing of event data independently from the state management application and the first list maintained by the state management application at the message queue layer, wherein the monitoring comprises keeping a second list at the processing layer of identities of batches that have been processed;
searching the second list maintained by the state keeper component at the processing layer for an identity of a retrieved but not yet processed batch; and
in response to finding the identity of the retrieved batch in the second list maintained by the state keeper component at the processing layer based on the searching, stopping processing of the retrieved batch by the processing application.

9. The method of claim 8, wherein the electronic device that reported the event is one of a mobile phone, a smart phone, a personal digital assistant (PDA), a wearable computer, a headset computer, a laptop computer, a notebook computer, or a tablet computer.

10. The method of claim 8, wherein the message queue is implemented with Kafka and the state management application is implemented with ZooKeeper.

11. The method of claim 8, wherein the processing application is implemented with Storm and the processing application is a Storm bolt.

12. The method of claim 8, wherein the processing application is implemented using Storm trident.

13. The method of claim 8, wherein the event data comprises a current location of a mobile communication device, a communication connection status of a mobile communication device, an identification of a download of a web page, or an identification of a content click event.

14. The method of claim 13, wherein the event data comprises an identity of a mobile communication device and a time and date.

15. A method of automatically adapting electronic content distribution, comprising:
receiving event data by a message queue executed on a computer system, where the event data comprises batches of tuples and each tuple comprises a transaction identity and data associated with an event reported by an electronic device that receives distributed electronic content;
assigning a state to each batch in a first list at a message queue layer by a state management layer executed on the computer system, where the state of a batch takes a value of not processed or processed;
retrieving a batch by a processing layer executed on the computer system from the message queue while leaving the batch on the message queue;
processing the batch by the processing layer, where the processing comprises one of incrementing a count in a memory store of the computer system, copying a final count from the memory store to a data store, or storing data in a cloud memory storage;
after processing the batch, sending a processed message that identifies the processed batch to the state management layer by the processing layer;
monitoring processed messages sent by the processing layer to the state management layer by a state keeper component that executes on the computer system within a processing layer to record processing of event data independently from the state management application and the first list maintained by the state management application at the message queue layer, wherein the monitoring comprises keeping a second list at the processing layer of identities of batches that have been processed;
searching the second list maintained by the state keeper component at the processing layer for an identity of a retrieved but not yet processed batch; and
in response to finding the identity of the retrieved batch in the second list maintained by the state keeper component at the processing layer based on the searching, stopping processing of the retrieved batch by the processing layer.

16. The method of claim 15, further comprising:
analyzing the final counts stored in the data store to generate reports on responses of electronic devices to electronic content distributed to the devices; and adapting a campaign of distributing electronic content to electronic devices based on the reports.

17. The method of claim 16, wherein the electronic content distributed by the campaign to electronic devices comprises a mobile advertisement, a public service announcement, a political announcement, or combinations thereof.

18. The method of claim 15, wherein the event data comprises a current location of a mobile communication device, a communication connection status of a mobile communication device, an identification of a download of a web page, or an identification of a content click event.

19. The method of claim 18, wherein the event data comprises an identity of a mobile communication device.

20. The method of claim 18, wherein the event data comprises a time and date.

\* \* \* \* \*